(12) United States Patent
Wylezinski (10) Patent No.: US 8,256,827 B2
(45) Date of Patent: Sep. 4, 2012

(54) BUTT JOINT FOR TRAILER SIDE WALL (75) Inventor: Andrzej Wylezinski, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 414 days.

(21) Appl. No.: 12/575,594

(22) Filed: Oct. 8, 2009

(65) Prior Publication Data
US 2010/0019537 A1    Jan. 28, 2010

Related U.S. Application Data (62) Division of application No. 11/972,730, filed on Jan. 11, 2008, now Pat. No. 7,677,642.

(60) Provisional application No. 60/884,825, filed on Jan. 12, 2007.

(51) Int. Cl.
B62D 33/023    (2006.01)
(52) U.S. Cl. ............... 296/186.1; 296/199; 52/584.1
(58) Field of Classification Search ............... 296/186.1, 296/199; 52/584.1
See application file for complete search history.

(56) References Cited

U.S. PATENT DOCUMENTS

| | | |
|---|---|---|
| 2,172,571 A | 9/1939 | Theriault |
| 2,322,088 A | 6/1943 | Black |
| 2,384,965 A | 9/1945 | Reid |
| 4,015,876 A | 4/1977 | Hulverson et al. |
| 4,212,405 A | 7/1980 | Schmidt |
| 4,357,047 A | 11/1982 | Katz |
| 4,455,807 A | 6/1984 | Ehrlich |
| 4,685,721 A | 8/1987 | Banerjea |
| 4,703,948 A | 11/1987 | Ehrlich |
| 4,940,279 A | 7/1990 | Abott et al. |
| 4,958,472 A | 9/1990 | Ehrlich |
| 5,052,741 A * | 10/1991 | Brown et al. ............... 296/191 |
| 5,066,066 A | 11/1991 | Yurgevich et al. |
| 5,112,099 A | 5/1992 | Yurgevich et al. |
| 5,286,079 A | 2/1994 | Zubko et al. |
| 5,439,266 A | 8/1995 | Ehrlich |
| 5,509,714 A | 4/1996 | Schmidt |
| 5,787,816 A | 8/1998 | Dworakowski et al. |
| 5,860,693 A | 1/1999 | Ehrlich |
| 5,876,089 A | 3/1999 | Ehrlich |
| 5,992,117 A | 11/1999 | Schmidt |

(Continued)

FOREIGN PATENT DOCUMENTS

WO    8300467    2/1983

(Continued)

OTHER PUBLICATIONS

Office Action dated May 6, 2009 for related U.S. Appl. No. 11/972,730 (8 pages).

(Continued)

*Primary Examiner* — Dennis Pedder (57) ABSTRACT

A sidewall of a trailer includes a side panel, an outer member, a base rail. The side panel is positioned within the channel. The outer member has a planar inner surface. The base rail has an upper portion offset from a lower portion. An outer surface of the upper portion of the base rail is generally parallel to and spaced from the inner surface of the outer member. A channel is defined by an outer surface of the upper portion of the base rail and the inner surface of the outer member. The side panel is positioned within the channel. The lower portion of the base rail is positioned beneath the channel.

12 Claims, 10 Drawing Sheets

U.S. PATENT DOCUMENTS

| | | | |
|---|---|---|---|
| 5,997,076 | A | 12/1999 | Ehrlich |
| 6,003,932 | A | 12/1999 | Banerjea et al. |
| 6,220,651 | B1 | 4/2001 | Ehrlich |
| 6,412,854 | B2 | 7/2002 | Ehrlich |
| 6,450,564 | B1 | 9/2002 | Sill |
| 6,527,335 | B1 | 3/2003 | Yurgevich |
| 6,578,902 | B2 | 6/2003 | Sill |
| 6,626,622 | B2 | 9/2003 | Zubko |
| 6,988,761 | B1 | 1/2006 | Stidham et al. |
| 7,114,762 | B2 * | 10/2006 | Smidler ............... 296/186.1 |
| 7,722,112 | B2 * | 5/2010 | Ehrlich ............... 296/186.1 |
| 2002/0180238 | A1 | 12/2002 | Sill |
| 2004/0232728 | A1 | 11/2004 | Smidler |
| 2005/0225118 | A1 | 10/2005 | Oren |
| 2006/0028050 | A1 | 2/2006 | Ehrlich |

FOREIGN PATENT DOCUMENTS

| | | |
|---|---|---|
| WO | 9810974 | 3/1998 |

OTHER PUBLICATIONS

Notice of Allowance documents dated Nov. 2, 2009 for related U.S. Appl. No. 11/972,730 (8 pages).

* cited by examiner

BUTT JOINT FOR TRAILER SIDE WALL

This application is a divisional application of U.S. patent application Ser. No. 11/972,730 filed on Jan. 11, 2008, which claims the domestic benefit of U.S. Provisional Application Ser. No. 60/884,825 filed on Jan. 12, 2007, which disclosures are hereby incorporated by reference.

FIELD OF THE INVENTION

This invention is generally directed to a butt joint for joining a side wall of a trailer to a base rail of a trailer.

BACKGROUND OF THE INVENTION

A side wall of a trailer is formed by at least one side panel positioned over a base rail. The at least one side panel forms an upper portion of the side wall and is joined with the base rail forming the lower portion of the side wall. The at least one side panel is joined with the base rail using a lap joint such as that shown in FIG. 1. The lap joint includes a splice member 10 which positions the side panel 12 relative to the base rail 14. The splice member 10, panel 12, and base rail 14 are secured into position using rivets 16. The side panels 12 and base rail 14 are thus stacked on one another or overlapped to form the lap joint. As a result, an offset is provided at the lap joint and the resulting side wall 8 is not planar. This offset between the side panels 12 and the base rail 14 results in a significant bending moment exerted to the lap joint during trailer operation which can result in deformation of the trailer side wall.

The present invention provides a butt joint between the side panels and the base rail which overcomes the problems presented in the prior art and which provides additional advantages over the prior art, such advantages will become clear upon a reading of the attached specification in combination with a study of the drawings.

SUMMARY OF THE INVENTION

Briefly, the present invention discloses a sidewall of a trailer which includes a side panel, an outer member, a base rail. The side panel is positioned within the channel. The outer member has a planar inner surface. The base rail has an upper portion offset from a lower portion. An outer surface of the upper portion of the base rail is generally parallel to and spaced from the inner surface of the outer member. A channel is defined by an outer surface of the upper portion of the base rail and the inner surface of the outer member. The side panel is positioned within the channel. The lower portion of the base rail is positioned beneath the channel.

BRIEF DESCRIPTION OF THE DRAWINGS

The organization and manner of the structure and operation of the invention, together with further objects and advantages thereof may best be understood by reference to the following description, taken in connection with the accompanying drawings, wherein like reference numerals identify like elements in which.

DETAILED DESCRIPTION OF THE ILLUSTRATED EMBODIMENTS

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 2:
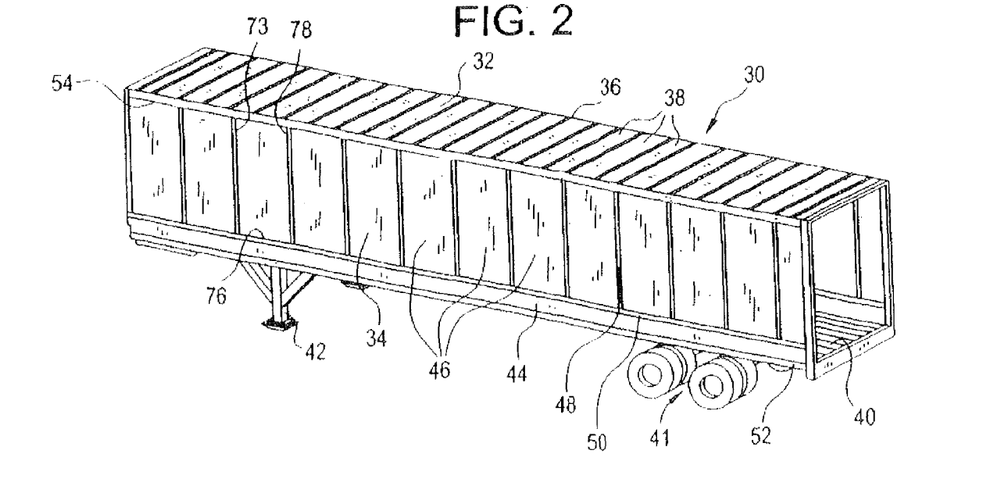
FIG. 2 is a perspective view of a trailer having a side wall formed using a butt joint which incorporates features of the present invention.

A butt joint 50 (shown as reference numeral 50 in FIG. 2, but can also be butt joint 100, 200, 300, 400, 500, 600, 700 or 800) is used in forming the sidewalls of a trailer 30 as shown in FIG. 2. The trailer 30 connects to a tractor (not shown) by conventional means, such as a fifth wheel assembly (not shown). The trailer 30 includes a body formed from a pair of rectangular sidewalls 34, a front wall (not shown), a rear door (not shown), a roof 36 formed by at least one top panel 38, and a floor structure 40. The floor structure 40 is supported by a conventional rear undercarriage assembly 41 and has a landing gear 42 secured thereunder. The sidewalls 34 are formed from a base rail 44 extending from a front of the trailer to a rear of the trailer and a plurality of side panels 46. Each side panel 46 is joined to an adjacent side panel 46 through a vertical joint 48 which is known in the art. Alternatively, the sidewall 34 can be formed of a continuous sheet. The butt joint 50 connects the lower portions of the side panels 46 to the base rail 44. A bottom rail 52 extends from the front of the trailer 30 to the rear of the trailer and joins the base rail 44 to the floor structure 40. A top rail 54 extends from the front of the trailer 30 to the rear of the trailer 30 and joins the upper ends of the side wall with the roof 36.

The base rail 44 is formed from aluminum and is generally rectangularly-shaped and planar. The base rail 44 has opposite inner and outer surfaces 58, 60, an upper edge 62, a lower edge 64 opposite the upper edge 62, a front edge 66, and a rear edge (not shown) opposite the front edge 66. Due to manufacturing processes, the base rail is often cambered or arc-shaped. Thus, the upper edge 62 of the base rail 44, at its center, is curved up or down. Although the base rail can be further processed to eliminate the arc and provide a planar upper edge 62, such additional processing increases the cost of the trailer.

Figure 14:
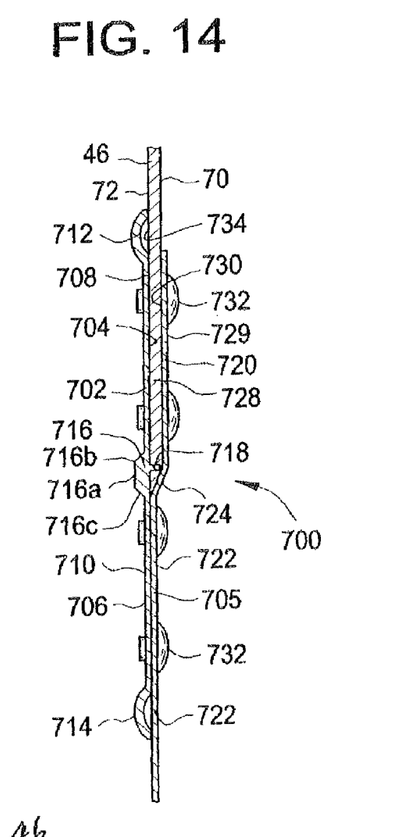
FIG. 14 is a cross-sectional view of a portion of a side wall of a trailer which incorporates a seventh embodiment of the butt joint.
Figure 14A:
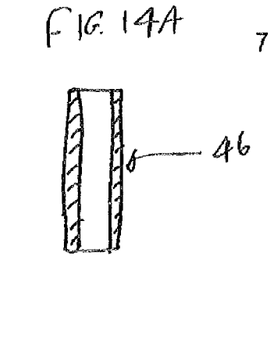
FIG. 14A shows the panel used in the present invention.

Each side panel 46 is formed from a composite plate formed from a pair of skins, with a core between the skins, as provided in DURAPLATE® trailers as shown in FIG. 14A. Each side panel 46 is generally-rectangular and planar. Each side panel 46 includes opposite inner and outer surfaces 70,72, an upper edge 74, a lower edge 76 opposite the upper edge 74, a front edge 73, and a rear edge 78 opposite the front edge 73. Each side panel 46 is positioned adjacent another side panel 46 such that the rear edge 78 of the first side panel 46 is adjacent the front edge 73 of an adjacent side panel 46. The thickness of each side panel 46 is slightly greater than the thickness of the base rail 44.

Figure 3:
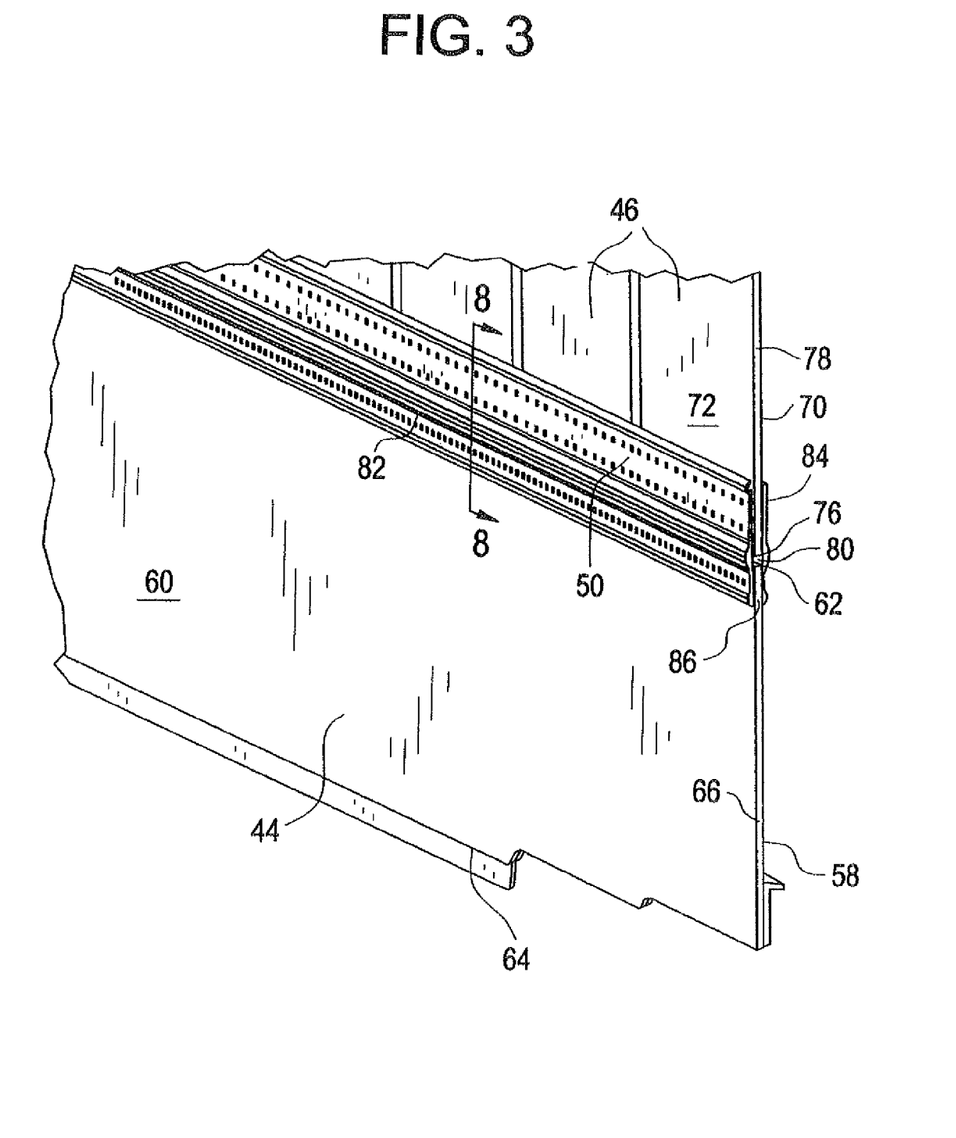
FIG. 3 is an outside perspective view of a portion of a trailer side wall which incorporates a first embodiment of the butt joint.

As shown in FIG. 3, the side panels 46 are positioned over the base rail 44 such that the lower edges 76 of the side panels 46 are proximate the upper edge 62 of the base rail 44. A gap 80 is provided between the lower edges 76 of the side panels 46 and the upper edge 62 of the base rail 44. As noted earlier, the upper edge 62 of the base rail 44 is often arc-shaped. In such an instance, the height of the gap 80 proximate the front and rear edges 66, 68 will vary relative to the height of the gap 80 proximate the center of the base rail 44. In some instances, no gap 80 results between the upper edge 62 of the base rail 44 and the lower edges 76 of the side panels 46. The side panels 46 and base rail 44 are further aligned such that the outer surfaces 72 of the side panels 46 and the outer surface 60 of the base rail 44 lie in the same plane.

The butt joint 50 includes an outer member 82 and an inner member 84 spaced from the outer member 82. A channel 86 is provided between the outer an inner members 82, 84 for receiving the side panels 46 and the base rail 44.

Figure 6:
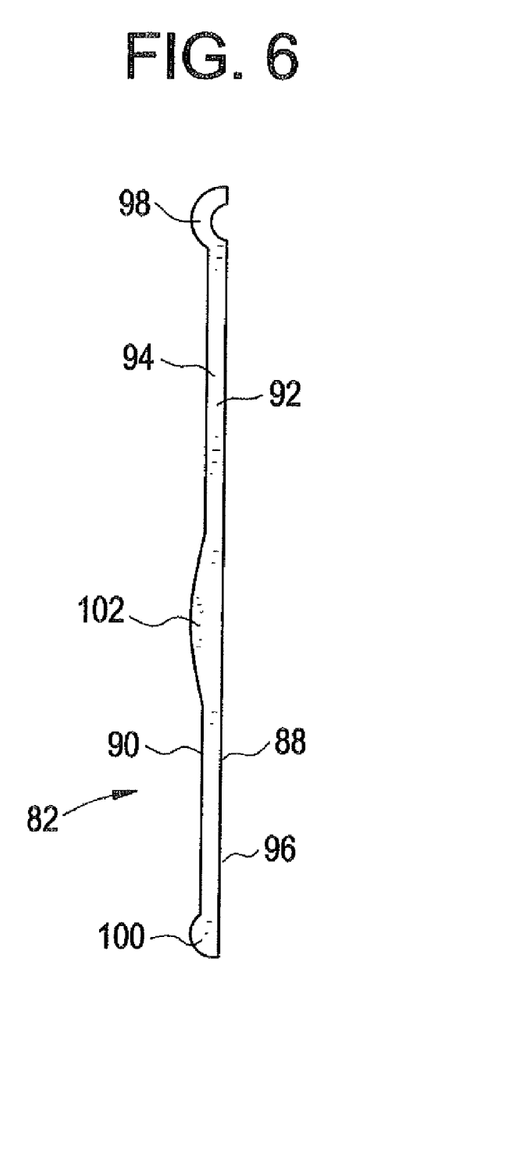
FIG. 6 is an elevational end view of an outer element of the butt joint of FIG. 3.

As best shown in FIG. 6, the outer member 82 generally includes an inner surface 88, an outer surface 90, a front end (not shown), a rear end 92, an upper portion 94, a lower portion 96, an upper end 98, a lower end 100, and a rail 102. The inner surface 88 is generally planar. Each of the upper end 93, lower end 100, and the rail 102 is elongated extending from the front end to the rear end 92 and are generally parallel to each other. The rail 102 is spaced from the upper and lower ends 98, 100 and extends outwardly. The rail 102 has a generally arc-shaped cross-section extending from the outer surface 90 such that the rail 102 provides a thickened portion of the outer member 82. The upper end 98 has a generally annularly-shaped cross-section and extends from the upper portion 94. The lower end 100 provides a generally semi-circularly-shaped cross-section and extends from the outer surface 90 proximate the lower portion 96. The upper portion 94 extends from the rail 102 to the upper end 98 and from the front end of the outer member 82 to the rear end 92. The lower portion 96 extends from the rail 102 to the lower end 100 and from the front end of the outer member 82 to the rear end 92.

Apertures are provided at spaced apart positions along the length of the outer member 82 between the upper end 98 and the rail 102. Apertures are provided at spaced apart positions along the length of the outer member 82 between the lower end 100 and the rail 102. Each aperture extends from the outer surface 90 to the inner surface 88 of the outer member 82.

Figure 7:
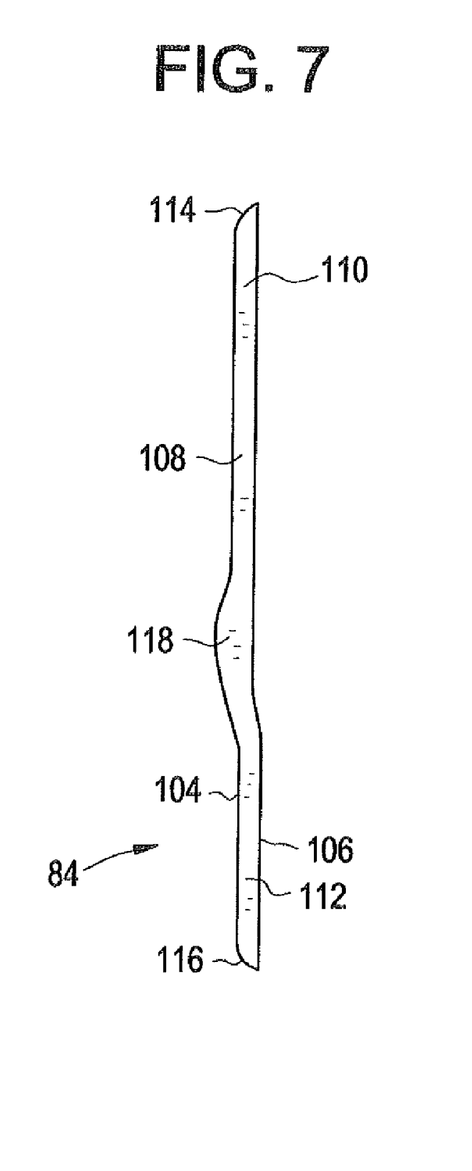
FIG. 7 is an elevational end view of an inner element of the but joint of FIG. 3.

The inner member 84 generally includes an inner surface 104, an outer surface 106, a front end 108, a rear end (not shown), an upper portion 110, a lower portion 112, an upper end 114, a lower end 116 and a rail 118. Each of the upper end 114, lower end 116, and rail 118 extends from the front end 108 to the rear end of the inner member 84 and are generally parallel to each other. The rail 118 is spaced from the upper and lower ends 114, 116 and extends inwardly from the inner surface 104. The rail 118 extends inwardly from the inner surface 104 and has a generally arc-shaped cross-section such that the rail 118 provides a thickened portion of the inner member 84. The lower portion 112 extends from the rail 118 to the lower end 116, and from the front end 108 to the rear end of the inner member 84. The upper portion 110 extends from the rail 118 to the upper end 114, and from the front end 108 to the rear end of the inner member 84. Upper and lower portions 110, 112 are offset. Accordingly, the outer surface 106 of the upper portion 110 is positioned inwardly (relative to the interior of the trailer) of the outer surface 106 of the lower portion 112.

Apertures are provided at spaced apart positions along the length of the inner member 84 between the lower end 116 and the rail 118. Apertures are provided at spaced apart positions along the length of the inner member 84 between the rail 118 and the upper end 114. Each aperture extends from the inner surface 104 to the outer surface 106 of the inner member 84.

Figure 8:
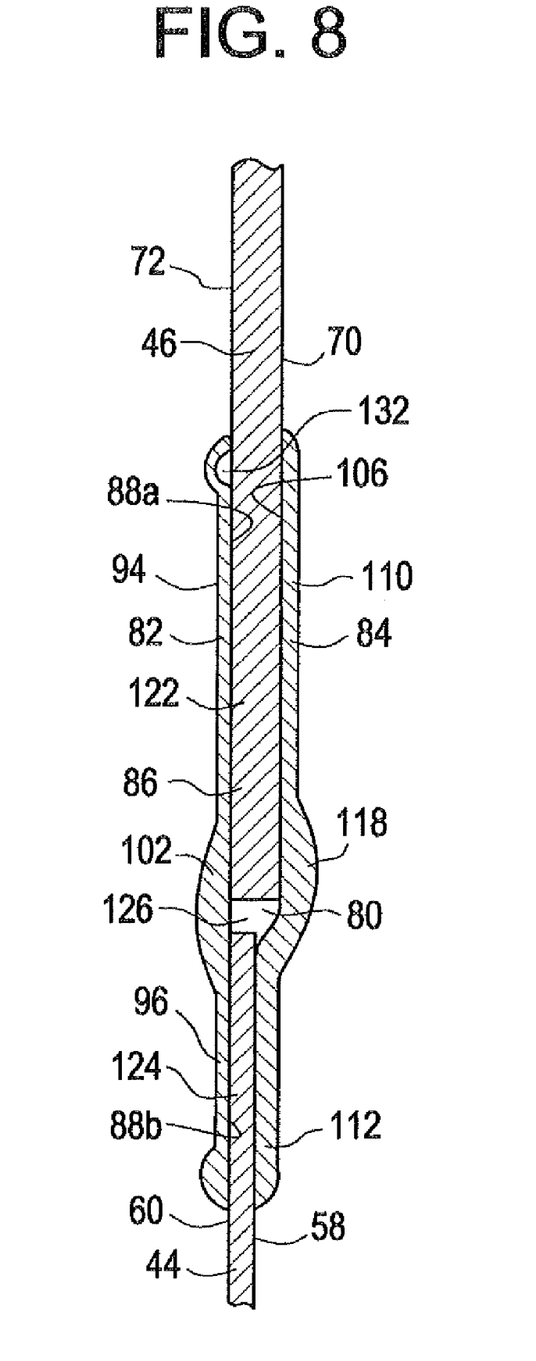
FIG. 8 is a cross-sectional view along line 8-8 of FIG. 3

As best shown in FIG. 8, the channel 86 is defined between the outer member 82 and the inner member 84 when the outer and inner members 82, 84 are faced towards each other, but are spaced apart a distance equal to the width of the side wall 34. More specifically, the channel 86 is defined by the inner surface 88 of the outer member 82 and the outer surface 106 of the inner member 84. The channel 86 includes an upper portion 122 provided between the inner surface 88 of the upper portion 94 of the outer member 82 and the outer surface 106 of the upper portion 110 of the inner member 84, a lower portion 124 provided between an inner surface 88 of the of the lower portion 96 of the outer member 82 and the outer surface 106 of the lower portion 112 of the inner member 84, and a transition portion 126 provided between the inner surface 88 of the rail 102 of the outer member 82 and the outer surface 106 of the rail 118 of the inner member 84. As shown, the width of the upper portion 122 of the channel 86 is greater than the width of the lower portion 124 of the channel 86.

The side panels 46 are positioned in the upper portion 122 of the channel 86 and the base rail 44 is positioned in the lower portion 124 of the channel 86 such that the gap 80 between the lower edge 76 of the side panels 46 and the upper edge 62 of the base rail 44 is positioned in the transition portion 126 of the channel 86. The outer surfaces 72 of the side panels 46 abut the inner surface 88 of the upper portion 94 of the outer member 82 and the inner surfaces 70 of the side panels 46 abut the outer surface 106 of the upper portion 100 of the inner member 84. The outer surface 60 of the base rail 44 abuts the inner surface 88 of the lower portion 96 of the outer member 82 and the inner surface 58 of the base rail 44 abuts the outer surface 106 of the lower portion 112 of the inner member 84. The planar nature of the inner surface 88 of the outer member 82 provides planar positioning of the outer surfaces 72 of the side panels 46 with the outer surface 60 of the base rail 44. As shown, the width of the side panel 46 is greater that the width of the base rail 44. The upper portion 122 of the channel 86 is therefore wider than the lower portion 124 of the channel 86 to accommodate the side panels 46 which have a greater width than the base rail 44. If side panel 46 does not have a width which is greater than the width of the base rail 44, the upper portion 122 of the channel 86 is not wider than the lower portion 124 of the channel 86.

Figure 4:
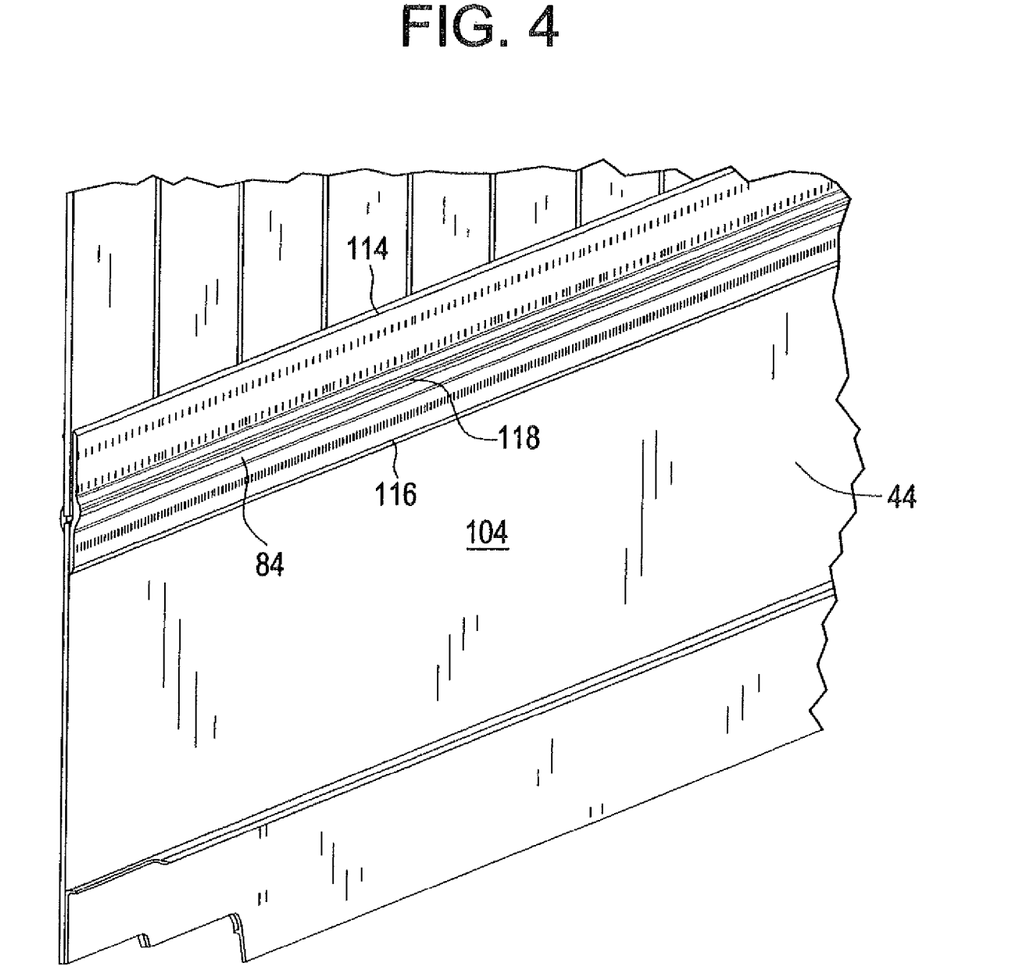
FIG. 4 is an inside perspective view of the portion of the trailer side wall of FIG. 3.
Figure 5:
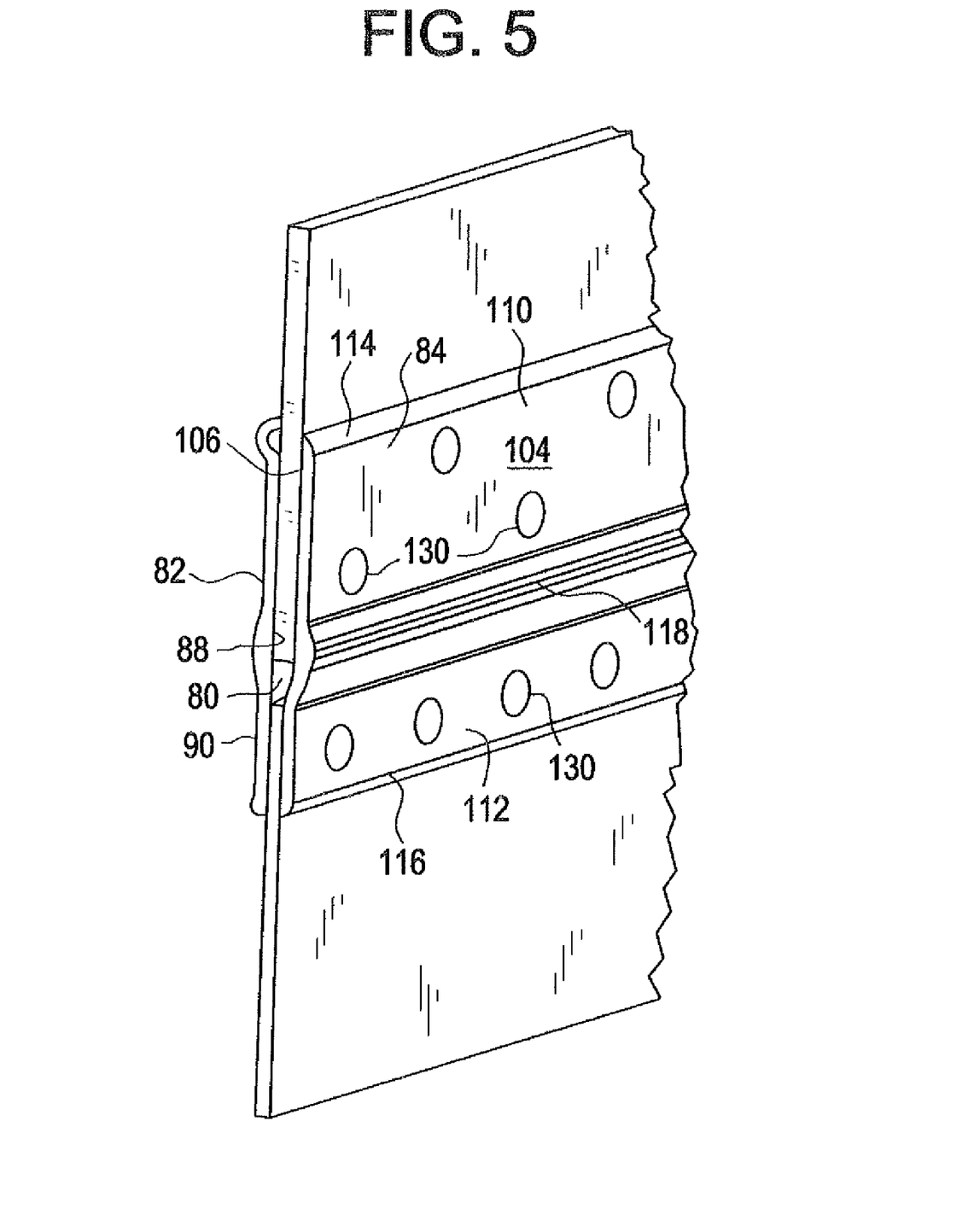
FIG. 5 is an enlarged view of the portion trailer side wall shown in FIG. 4.

As best shown in FIGS. 3-5, fasteners 130 are provided through the apertures of the upper portion 94 of the outer member 82, through the side panels 46 and through the apertures of the upper portion 110 of the inner member 84 to secure the outer and inner members 82, 84 to the side panels 46. Fasteners are also provided through the apertures of the lower portion 96 of the outer member 82, through the base rail 44 and through the apertures of the lower portion 112 of the inner member 84 to secure the outer and inner members 82, 84 to the base rail 44. A butt joint 50 is therefore formed between the side panels 46 and the base rail 44. It is to be understood that alternative means, such as, adhesives could be used to secure the outer and inner members 82, 84 to the side panels 46 and base rail 44, or, a combination of fasteners and adhesives could be used to secure the outer and inner members 82, 84 to the side panels 46 and base rail 44. If only adhesives are used to secure the members 82, 84 then the apertures will be removed from the outer and inner members 42, 44.

Figure 1:
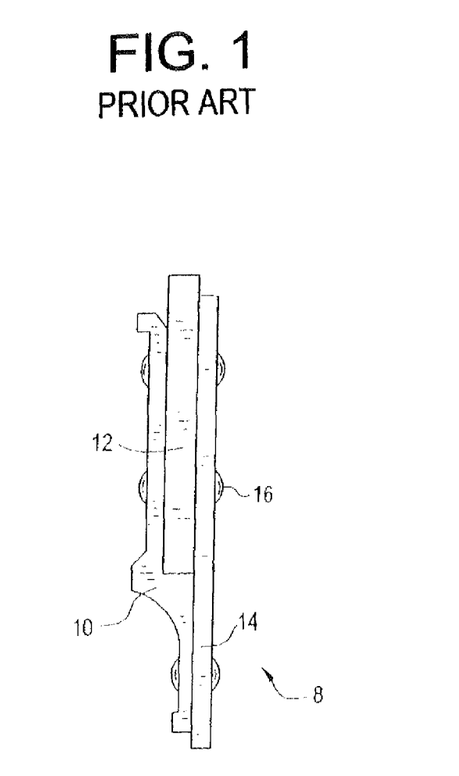
FIG. 1 is a cross-sectional view of a prior art lap joint used in forming a trailer side wall.

By removing the offset as found in the prior art, See FIG. 1, and providing vertical alignment of the outer surfaces 60, 72 of the base rail 44 and the side panels 46, a bending moment exerted to the butt joint 50 during operation of the trailer is minimized. In addition, the outer and inner members 82, 84 act as structural members of the sidewall 34 capable of carrying shear and bending forces. Thus, the structural integrity of the sidewall 34 is improved by the butt joint 50. Furthermore, the butt joint 50 provides for an improved load capacity and improved floor strength capacity. The butt joint 50 also provides for simplified assembly of the trailer, lowers the tare weight of the trailer and lowers the manufacturing costs.

The rail 102 of the outer member 82 and the rail 118 of the inner member 84 carry vertical compressive forces acting on the butt joint 50 and prevent the outer and inner members 82, 84 from deforming as a result of such forces.

When the outer member 82 is positioned proximate the side panels 46, a cavity 132 (see FIG. 8) is defined between the upper end 98 and the outer surfaces of the side panels 46. An adhesive/sealant is placed in the cavity 132 to prevent moisture from entering the trailer through the butt joint 50. Furthermore, in the event fasteners 130 are used in assembling the butt joint 50 with the panels 46 and the base rail 44, the rails 102, 118 provide protection to the fasteners 130. The rails 102, 118 prevent shearing off of the fasteners 130 in the event the trailer rubs against another trailer or in the event cargo or equipment used to load cargo rubs along the interior of the trailer side wall. Such protection results in lower equipment maintenance cost.

Figure 9:
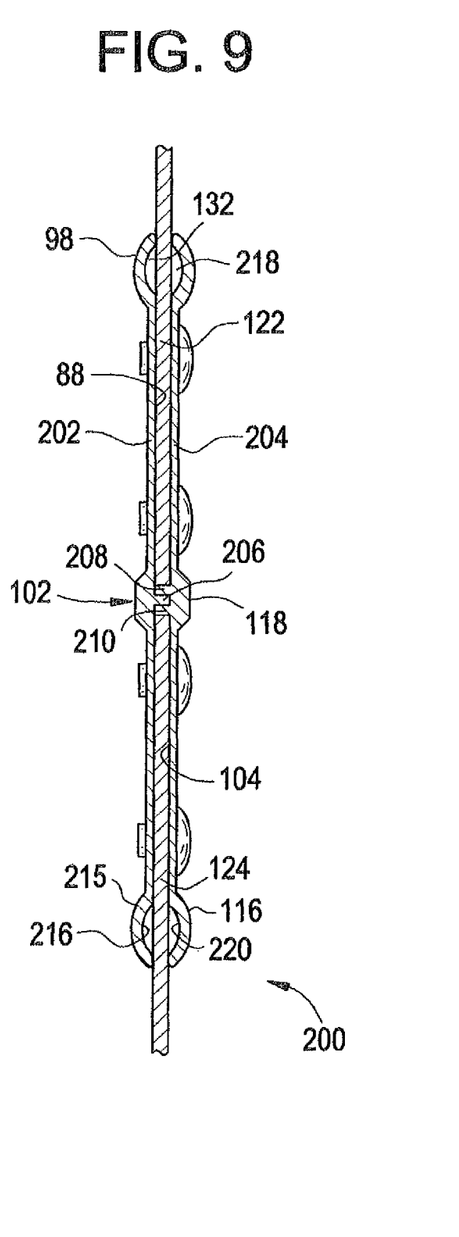
FIG. 9 is a cross-sectional view of a portion of a side wall of a trailer incorporates a second embodiment of the butt joint.

A second embodiment of the butt joint 200 is shown in FIG. 9. The butt joint 200 includes an outer member 202 and an inner member 204 which are similar to the outer and inner members 82, 84 of the butt joint 50, with the following exceptions.

The outer member 202 includes an inwardly extending tongue 206. The tongue 206 extends opposite the rail 102 and is generally perpendicular to the inner surface 88 of the outer member 202. The tongue 206 extends from the front end to the rear end 92 of the outer member 202. Unlike the lower end 100 of the outer member 82 which provides a generally semi-circularly shaped cross-section, the lower end 215 of the outer member 202 provides an arc-shaped cross-section.

The inner member 204 includes an upper flange 208 and a lower flange 210, each extending outwardly opposite the rail 118. The upper and lower flanges 208, 210 extend from the front end to the rear end of the inner member 204. The upper and lower flanges 208, 210 generally extend perpendicular to the inner surface 104 of the inner member 204. A slot is provided between the upper and lower flanges 208, 210. A sealant cavity 218 is provided by the upper edge 114 of the inner member 204 and a sealant cavity 220 is provided by the lower edge 116 of the inner member 204.

When the butt joint 200 is assembled with the side panels 46 and the base rail 44, the tongue 206 of the outer member 202 extends within the slot provided between the upper and lower flanges 208, 210 of the inner member 204. The interengaged tongue 206 and flanges 208, 210 provide a bridge between the outer member 202 and the inner member 204 which separates the upper portion 122 of the channel 86 from the lower portion 124 of the channel 86. As shown, the width of the upper portion 122 of the channel 86 is greater than the width of the lower portion 124 of the channel 86.

The side panels 46 are positioned in the upper portion 122 of the channel 86. The lower edge of each side panel 46 contacts an upper surface of the upper flange 208.

The base rail 44 is positioned in the lower portion 124 of the channel 86. Portions of the upper edge of the base rail 44 abut the lower surface of the lower flange 210. As noted earlier, the height of the base rail 44 may be greater at its center than the height of the base rail 44 proximate its front and rear edges 66, 68. Thus, it is likely the base rail 44 will contact the lower surface of the lower flange 210 proximate the center of the base rail 44, and a gap will remain between the base rail 44 and the lower surface of the lower flange 210.

The planar nature of the inner surface 88 of the outer member 202 of the butt joint 200 provides planar positioning of the outer surfaces of the side panels 46 and base rail 44. The widths of the upper and lower portions 122, 124 of the channel 86 are determined based upon respective widths of the side panels 46 and base rail 44 to be positioned within the channel 86. As shown, the width of the side panels 46 is greater than the width of the base rail 44 and, therefore, the upper portion 122 of the channel 86 is wider than the lower portion 124 of the channel 86. It is to be understood that if the width of the side panel 46 was not greater than the width of the base rail 44, the upper portion 122 of the channel 86 would not be wider than the lower portion 124 of the channel 86.

In addition to providing support for vertical compressive forces, the flanges 208, 210 assist in aligning the side panels 46 and base rail 44 within the channel 86 prior to fastening.

Figure 10:
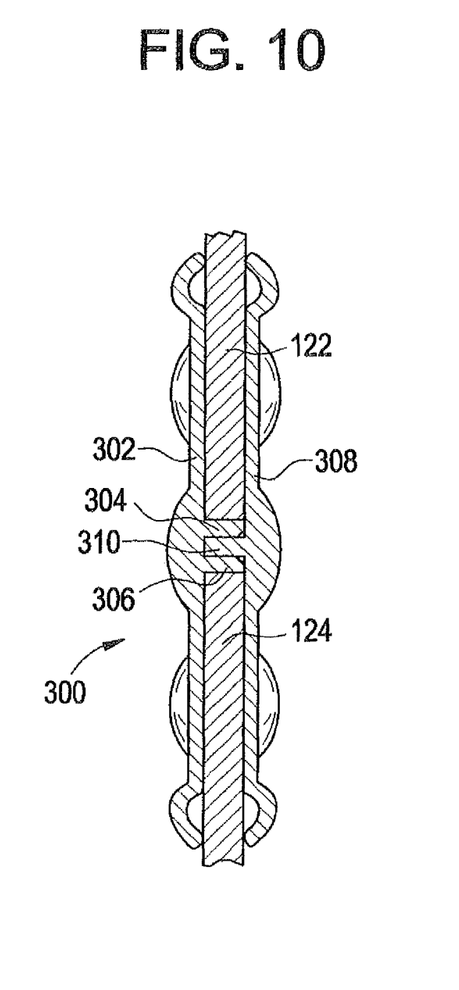
FIG. 10 is a cross-sectional view of a portion of a side wall of a trailer which incorporates a third embodiment of the joint.

A third embodiment of the butt joint 300 is shown in FIG. 10. The butt joint 300 is identical to the butt joint 50 shown in FIG. 9 except for the following. Rather than a single inwardly extending tongue, the outer member 302 of the butt joint 300 includes upper and lower inwardly extending flanges 304, 306. Rather than two outwardly extending flanges, the inner member 308 includes a single outwardly extending tongue 310. When assembled, the tongue 310 of the inner member 308 extends within the gap provided between the upper and lower flanges 304, 306 of the outer member 302. The interengaged tongue 310 and flanges 304, 306 provide a bridge between the outer member 302 and the inner member 308.

As shown, the upper and lower portions 122, 124 of the channel 86 have the same width. The portions 122, 124 of the channel 86 can of course be modified to accept panels 46 and base rails 44 having varying widths.

Figure 11:
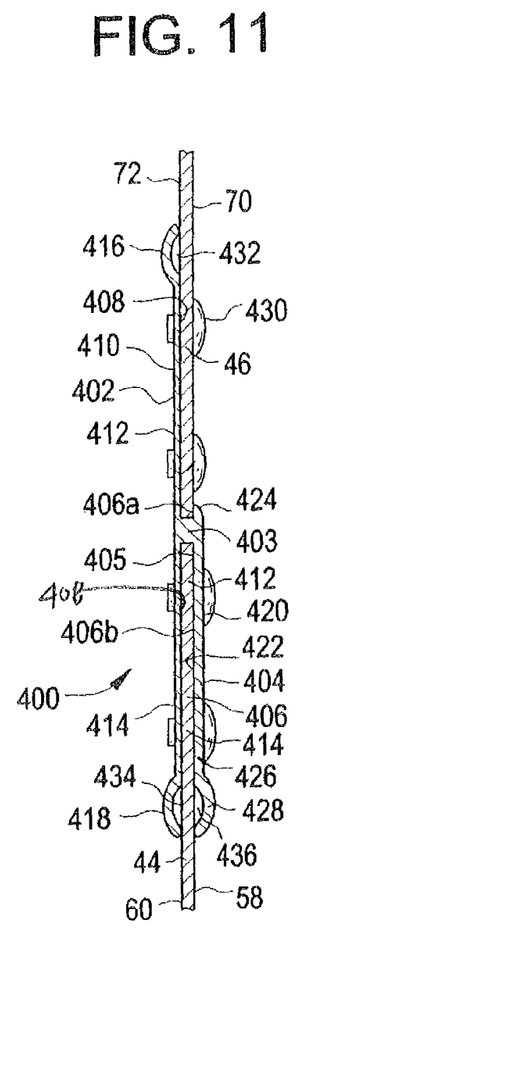
FIG. 11 is a cross-sectional view of a portion of a side wall of a trailer which incorporates a fourth embodiment of the butt joint.

A fourth embodiment of the butt joint 400 is shown in FIG. 11. The butt joint 400 includes an outer member 402 and an inner member 404 spaced from and connected to the outer member 402 by a bridge 403. The outer member 402, inner member 404 and bridge 403 are integrally formed. A channel 406 is provided between the outer and inner members 402, 404 for receiving the side panels 46 and the base rail 44.

The outer member 402 generally includes an inner surface 408, an outer surface 410, a front end (not shown), a rear end (not shown), an upper portion 412, a lower portion 414, an upper end 416 extending from the upper portion 412, and a lower end 418 extending from the lower portion 414. The inner surface 408 is generally planar. The upper end 416 and the lower end 418 are elongated, extend from the front end to the rear end, and are generally parallel to each other. The upper and lower ends 416, 418 have a generally annularly-shaped cross-section. The upper portion 412 extends from the bridge 403 to the upper end 416 and from the front end of the outer member 402 to the rear end. The lower portion 414 extends from the bridge 403 to the lower end 418 and from the front end of the outer member 402 to the rear end.

Apertures are provided at spaced apart positions along the length of the outer member 402 between the upper end 416 and the bridge 403. Apertures are provided at spaced apart positions along the length of the outer member 402 between the lower end 418 and the bridge 403. Each aperture extends from the outer surface 410 to the inner surface 408 of the outer member 402.

The inner member 404 generally includes an inner surface 420, an outer surface 422, a front end (not shown), a rear end (not shown), an upper tab 424, a lower portion 426, and a lower end 428. The lower end 428 extends from the front end to the rear end of the inner member 404. The lower portion 426 extends from the bridge 403 to the lower end 428, and from the front end to the rear end of the inner member 404. The upper tab 424 extends upwardly from the bridge 403, and from the front end to the rear end of the inner member 404. The upper tab 424 and the lower portion 426 are offset. Accordingly, the outer surface 422 of the upper tab 424 is positioned inwardly (relative to the interior of the trailer) of the outer surface 422 of the lower portion 426.

Apertures are provided at spaced apart positions along the length of the inner member 404 between the lower end 428 and the bridge 403. The apertures extend from the inner surface 420 to the outer surface 422 of the inner member 404.

The channel 406 is defined between the outer member 402 and the inner member 404 More specifically, the channel 406 is defined by the inner surface 408 of the outer member 402 and the outer surface 422 of the inner member 404. The channel 406 includes an upper portion 406a provided between the inner surface 408 of the upper portion 412 of the outer member 402 and the outer surface 422 of the upper tab 424 of the inner member 404, and a lower portion 406b provided between an inner surface 408 of the lower portion 414 of the outer member 402 and the outer surface 422 of the lower portion 426 of the inner member 404. The width of the upper portion 406a of the channel 406 is greater than the width of the lower portion 406b of the channel 406.

The side panels 46 are positioned in the upper portion 406a of the channel 406 such that the lower edge of the side panel 46 contacts an upper surface of the bridge 403. The base rail 44 is positioned in the lower portion 406b of the channel 406 such that at least a portion of the upper end of the base rail 44 contacts a lower surface of the bridge 403. The outer surfaces 72 of the side panels 46 abut the inner surface 408 of the upper portion 412 of the outer member 402 and the inner surfaces 70 of the side panels 46 abut the outer surface 422 of the upper tab 424 of the inner member 404. The outer surface 60 of the base rail 44 abuts the inner surface 408 of the lower portion 414 of the outer member 402 and the inner surface 58 of the base rail 44 abuts the outer surface 422 of the lower portion 426 of the inner member 404. The planar nature of the inner surface 408 of the outer member 402 provides planar positioning of the outer surfaces 72 of the side panels 46 with the outer surface 60 of the base rail 44. As shown, the width of the side panel 46 is greater that the width of the base rail 44. The upper portion 406a of the channel 406 is therefore wider than the lower portion 406b of the channel 406 to accommodate the side panels 46 which have a greater width than the base rail 44. If side panel 46 does not have a width which is greater than the width of the base rail 44, the upper portion 406a of the channel 406 will not be formed wider than the lower portion 406b of the channel 406.

Fasteners 430 are provided through the apertures of the upper portion 412 of the outer member 402 and through the side panels 46 to secure the outer members 402 to the side panels 46. Fasteners are also provided through the apertures of the lower portion 414 of the outer member 402, through the base rail 44 and through the apertures of the lower portion 426 of the inner member 404 to secure the outer and inner members 402, 404 to the base rail 44. The butt joint 400 is therefore formed between the side panels 46 and the base rail 44. It is to be understood that alternative means, such as, adhesives could be used to secure the outer and inner members 402, 404 to the side panels 46 and base rail 44, or a combination of fasteners and adhesives could be used to secure the outer and inner members 402,404 to the side panels 46 and base rail 44. If only adhesives are used to secure the members 402, 404 then the apertures will be removed from the outer and inner members 402, 404.

Similar to the butt joint 50, by removing the offset as found in the prior art, see FIG. 1, and providing vertical alignment of the outer surfaces 60, 72 of the base rail 44 and the side panels 46, a bending moment exerted to the butt joint 400 during operation of the trailer is minimized. In addition, the outer and inner members 402, 404 act as structural members of the sidewall 34 capable of carrying shear and bending forces. Thus, the structural integrity of the sidewall 34 is improved by the butt joint 400. Furthermore, the butt joint 400 provides for an improved load capacity and improved floor strength capacity. The butt joint 400 also provides for simplified assembly of the trailer, lowers the tare weight of the trailer and lowers the manufacturing costs.

When the outer member 402 is positioned proximate the side panels 46 and base rail 44, a cavity 432 is defined between the upper end 416 and the outer surfaces of the side panels 46 and a cavity 434 is defined between the lower end 418 and the outer surface of the base rail 44. When the inner member 404 is positioned proximate the base rail 44 a cavity 436 is defined between the lower end 428 and the outer surface 58 of the base rail 44. An adhesive/sealant is placed in the cavities 432, 434, 436 to prevent moisture from entering the trailer through the butt joint 400.

Figure 12:
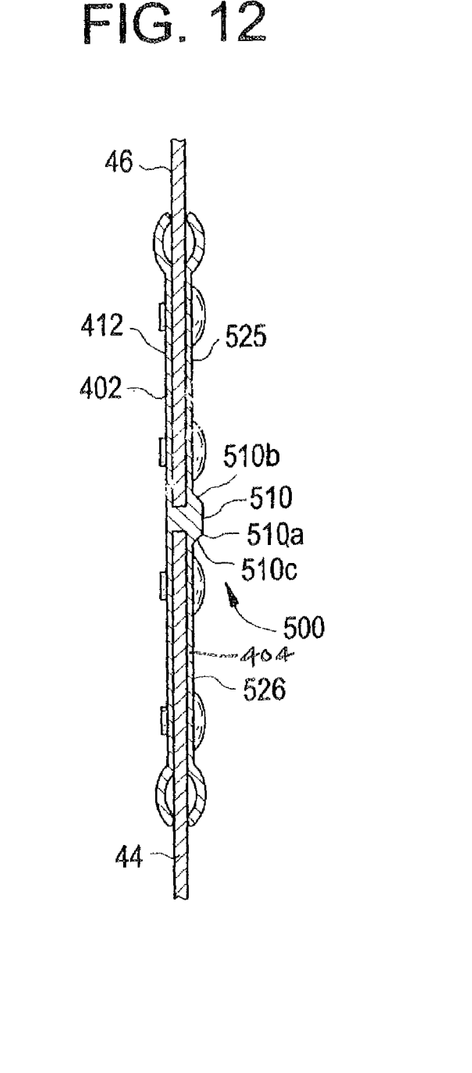
FIG. 12 is a cross-sectional view of a portion of a side wall of a trailer which incorporates a fifth embodiment of the butt joint.

A fifth embodiment of the butt joint 500 is shown in FIG. 12. The butt joint 500 is identical to the butt joint 400 shown in FIG. 11 except for the following features. Rather than providing an upper tab 424 on the inner member 404, an inner member 504 of the butt joint 500 includes an upper portion 525 which is approximately the same length as the upper portion 412 of the outer member 402. The inner member 505 further includes an elongated inwardly extending rail 500 which extends from the front of the inner member 504 to the rear of the inner member 504. The innermost surface 510a of the rail 510 is generally planar and parallel to the side panel 46 and base rail 44. A first inclined surface 510b extends from the inner most surface 510a to the upper portion 525 of the inner member 504 and a second inclined surface 510c extends from the inner most surface 510a to a lower portion 526 of the inner member 504.

Figure 13:
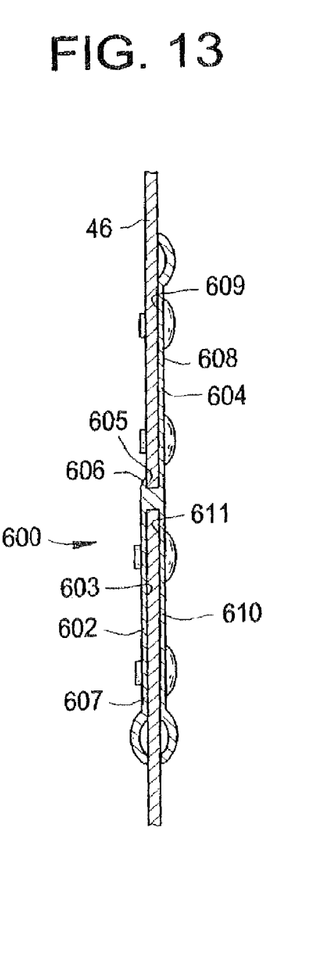
FIG. 13 is a cross-sectional view of a portion of a side wall of a trailer which incorporates a sixth embodiment of the butt joint.

A sixth embodiment of the butt joint 600 is shown in FIG. 13. The butt joint 600 includes an outer member 602 and an inner member 604. The butt joint 600 is similar to the butt joint 400 of FIG. 11 with the following exceptions. The tab 424 of the butt joint 400 is replaced with an upper portion 608 of the inner member 604, and the upper portion of the outer member 412 of the butt joint 400 is replaced with a tab 606. Thus, the inner surface 605 of the tab 608 and the inner surface 603 of a lower portion 607 of an outer member 602 are planar and the outer surface 609 of the upper portion 608 of the inner member 604 is off set from the outer surface 611 of the lower portion 610 of the inner member 604.

A seventh embodiment of the butt joint 700 is shown in FIG. 14. The butt joint 700 is generally formed by an outer member 702 and a base rail 705 having an offset upper portion 720. The portions of the base rail 705 proximate to the outer member 702 form the inner member. The outer member 702 generally includes an inner surface 704, an outer surface 706, a front end (not shown), a rear end (not shown), an upper portion 708, a lower portion 710, an upper end 712, a lower end 714, a rail 716, and a tongue 718. The inner surface 704 of the outer member 702 is generally planar. The upper end 712, the lower end 714, the rail 716, and the tongue 718 extend from the front end of the outer member 702 to the rear end of the outer member 702 and are generally parallel to each other. The tongue 718 extends inwardly and is positioned opposite the rail 716. The rail 716 is elongated and extends from the front end to the rear end of the outer member. The rail 716 includes first planar surface 716 which is generally parallel to the inner surface 704 of the outer member 702, a second inclined surface 716b which extends inwardly from the first surface 716 of the upper portion 708, and a third inclined surface 716c which extends inwardly from the first surface 716a to the lower portion 710. The upper portion 708 of the outer member 702 extends from the rail 716 to the upper end 712 and from the front end of the outer member 702 to the rear end of the outer member 702. The lower portion 706 of the outer member 702 extends from the rail 716 to the lower end 714 and from the front end of the outer member 702 to the rear end of the outer member 702.

Apertures are provided at spaced apart positions along the length of the outer member 702 between the upper edge 712 and the rail 716. Apertures are also provided at spaced apart positions along the length of the outer member 702 between the lower edge 714 and the rail 716. Each aperture extends from the outer surface 706 of the outer member 702 to the inner surface 704 of the outer member 702.

The base rail 705 includes the offset upper portion 720, a lower portion 722, a transition portion 724 between the upper and lower portions 720, 722, an inner surface 729, an outer surface 730, and front and rear ends (not shown). The upper portion 720 is offset from the lower portion 722 such that the upper portion 720 is positioned inwardly relative to the lower portion 722. The lower portion 722 of the base rail 705 is parallel to the inner surface 704 of the outer member 702 and is in contact with the inner surface 704. The upper portion 720 of the base rail 705 is parallel to the inner surface 704 of the outer member 702, but is spaced from the inner surface 704. The transition portion 724 of the base rail 705 extends inwardly and upwardly from the upper edge of the lower portion 722 to the lower edge of the upper portion 720. When placed between the outer member 702 and the inner member 704, a channel 728 is defined by the inner surface 704 of the outer member 702 and the outer surface 730 of the upper portion 720 of the base rail 705. The tongue 718 of the outer member 702 contacts the upper portion 720 of the base rail 705 proximate the transition portion 724.

Apertures are provided at spaced apart positions through the upper and lower portions 708, 710 of the outer member 702. Apertures are provided at spaced apart positions through the upper and lower portions 720, 722 of the base rail 705 and are aligned with the apertures of the outer member 702.

When assembled with the side panels 46, the outer surfaces 72 of the side panels 46 contact the inner surface 704 of the outer member 702; the inner surfaces 70 of the side panels 46 contact the outer surface 730 of the upper portion 720 of the base rail 705; and the lower edges 76 of the side panels 46 contact an upper surface of the tongue 718.

Fasteners 732 are provided through the apertures in the upper portion 708 of the outer member 702, through the side panels 46 and through the apertures of the upper portion 720 of the base rail 705 to secure the outer member 702 and the base rail 705 to the side panels 46. Fasteners 732 are provided through the apertures of the lower portion 706 of the outer member 702 and through the lower portion 722 of the base rail 705 to secure the outer member 702 to the base rail 705. The butt joint 700 is provided between the side panels 46 and the lower portion 722 of the base rail 705. It is to be understood that alternative means, such as, for example adhesives could be used to secure the outer member 702 to the side panels 46 and base rail 705 and to secure the side panels 46 to the base rail 705 and the apertures eliminated. In addition, a combination of fasteners and adhesives can be used to secure the outer member 702 to the side panels 46 and base rail 705 and to secure the side panels 46 to the base rail 705.

The butt joint 700 provides vertical alignment between the outer surface 72 of the side panel 46 and the outer surface 730 of the lower portion 722. By removing the offset as found in the prior art a bending moment exerted on the butt joint 700 during operation of the trailer is minimized. In addition, the outer member 702 acts as a structural member of the side wall 34 capable of carrying sheer and bending forces. The butt joint 700 also provides for simplified assembly of the trailer lowers the tare weight of the trailer and lowers the manufacturing costs.

The rail 716 of the outer member 702 carries vertical compressive forces acting on the butt joint 700 and prevents the outer member 702 from deforming as a result of such forces.

When the outer member 702 is positioned proximate the side panels 46, a cavity 734 is defined between the upper end 712 and the outer surface 72 of the side panel 46. An adhesive/sealant is placed in the cavity 734 to prevent moisture for entering the trailer through the butt joint 700. Furthermore, in the event fasteners are used in assembling the butt joint 700, the panels 46, the rail 716 provides protection to the fasteners 732 to prevent shearing off of the fasteners 732.

Figure 15:
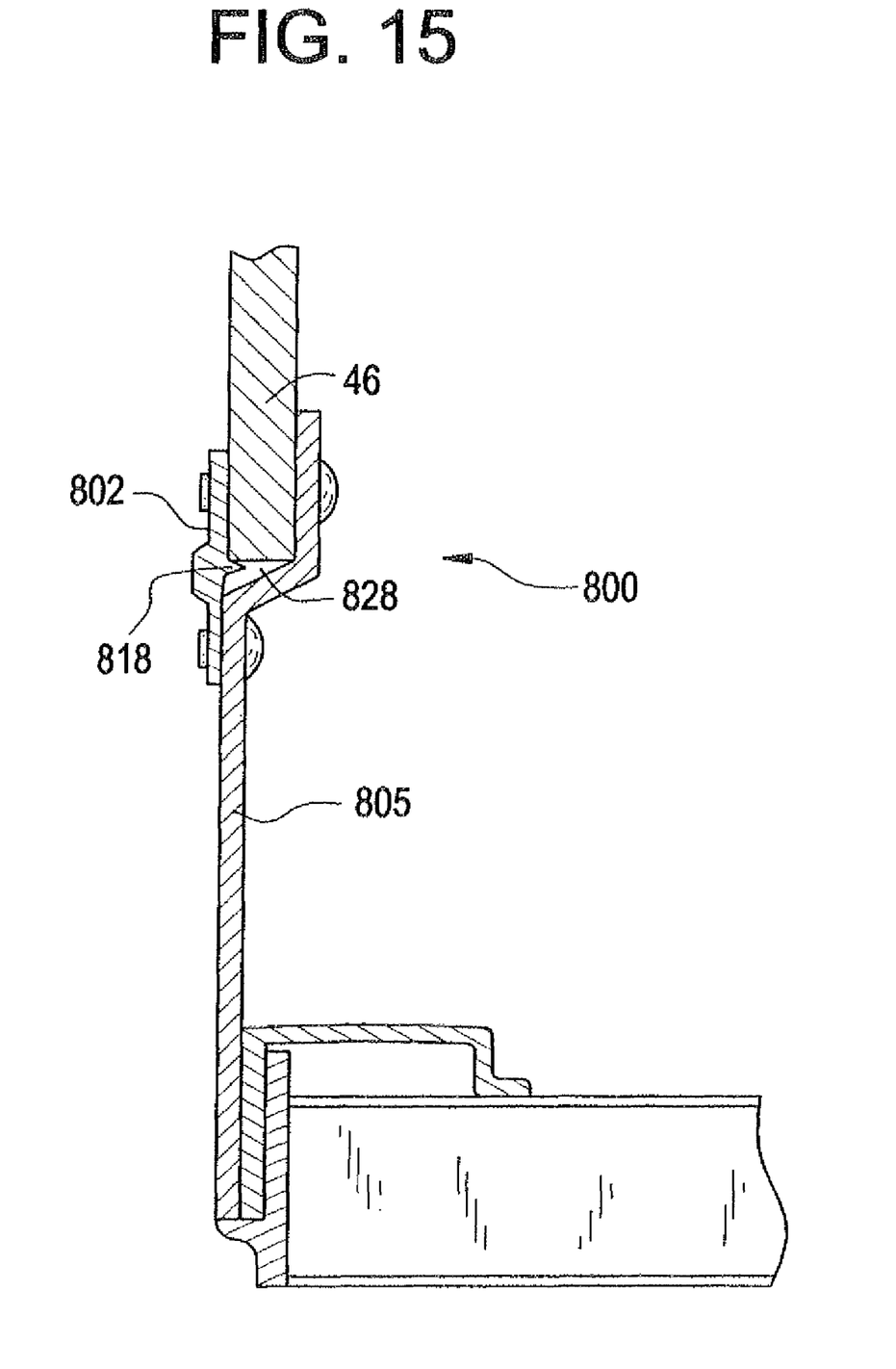
FIG. 15 is a cross-sectional view of a portion of a side wall of a trailer which incorporates an eighth embodiment of the butt joint.

An eighth embodiment of the butt joint 800 is shown in FIG. 15. The butt joint 800 includes an outer member 802 and a base rail 805 having an offset upper portion 805. The butt joint 800 is identical to the butt joint 700 shown in FIG. 14 with the following exception. The outer member 702 of the butt joint 700 has an inwardly extending tongue 718 opposite the rail 716 which extends across the channel 728. In contrast, the outer member 802 of the butt joint 800 includes a tooth 818 extending into the channel between the outer member 802 and the base rail 805, but does not contact the base rail 805. The tooth 818 provides assistance to align the outer member 802 with the side panel 46 when assembling the outer member 802, side panel 46 and base rail 805.

While preferred embodiments of the present invention are shown and described, it is envisioned that those skilled in the art may devise various modifications of the present invention without departing from the spirit and scope of the appended claims.

The invention claimed is:

1. A sidewall of a trailer comprising:
a side panel;
an outer member;
a base rail having an upper portion offset from a lower portion, an outer surface of said upper portion of said base rail is generally parallel to and spaced from said inner surface of said outer member, wherein the outer member is coupled to and engaged with (i) the side panel and (ii) the lower portion of the base rail;
a channel defined by an outer surface of said upper portion of said base rail and said inner surface of said outer member, said side panel being positioned within said channel; and
said lower portion of said base rail is positioned beneath said channel,
wherein the outer member includes a first portion engaged with the side panel and a second portion engaged with the lower portion of the base rail, and wherein the first and second portions of the outer member each define respective first and second inner planar surfaces that are generally vertically-aligned with each other.

2. A sidewall as defined in claim 1, wherein said outer member further includes a rail.

3. A sidewall as defined in claim 1, wherein said outer member includes a protrusion positioned above said lower portion of said base rail and extending inwardly.

4. A sidewall as defined in claim 3, wherein said protrusion extends to an outer surface of said base rail.

5. A sidewall as defined in claim 3, wherein said outer member further includes an adhesive cavity.

6. A sidewall as defined in claim 3, wherein said outer member is secured to said base rail using fasteners.

7. A sidewall as defined in claim 3, wherein said outer member is secured to said base rail using adhesive.

8. A sidewall as defined in claim 1, wherein an outer surface of the lower portion of the base rail is generally aligned with an outer surface of the side panel.

9. A sidewall as defined in claim 1, wherein substantially all of the lower portion of the base rail is beneath the side panel.

10. A sidewall as defined in claim 5, wherein the cavity is formed in the first portion of the outer member.

11. A sidewall as defined in claim 1, wherein a centerline of the lower portion of the base rail is positioned outwardly from a centerline of the side panel.

12. A sidewall of a trailer comprising:
a side panel;
an outer member;
a base rail having an upper portion offset from a lower portion, an outer surface of the upper portion of the base rail is generally parallel to and spaced from the inner surface of the outer member, wherein the outer member is coupled to and engaged with (i) the side panel and (ii) the lower portion of the base rail; and
a channel defined by an outer surface of the upper portion of the base rail and the inner surface of the outer member, the side panel being positioned within the channel,
wherein the base rail is positioned beneath the channel,
wherein the outer member includes a first portion engaged with the side panel and a second portion engaged with the lower portion of the base rail, and wherein the first and second portions of the outer member each define respective first and second inner planar surfaces that are generally vertically-aligned with each other,
wherein an outer surface of the lower portion of the base rail is generally aligned with an outer surface of the side panel and a centerline of the lower portion of the base rail is positioned outwardly from a centerline of the side panel, and
wherein the first portion of the outer member includes a cavity having adhesive therein.

* * * * *